United States Patent
Barron et al.

(10) Patent No.: US 9,762,893 B2
(45) Date of Patent: Sep. 12, 2017

(54) SYSTEMS AND METHODS FOR MULTISCOPIC NOISE REDUCTION AND HIGH-DYNAMIC RANGE

(71) Applicant: Google Inc., Mountain View, CA (US)

(72) Inventors: Jonathan Tilton Barron, Sunnyvale, CA (US); Stephen Joseph DiVerdi, Oakland, CA (US); Ryan Geiss, San Jose, CA (US)

(73) Assignee: Google Inc., Mountain View, CA (US)

( * ) Notice: Subject to any disclaimer, the term of this patent is extended or adjusted under 35 U.S.C. 154(b) by 94 days.

(21) Appl. No.: 14/961,102

(22) Filed: Dec. 7, 2015

(65) Prior Publication Data

US 2017/0163966 A1     Jun. 8, 2017

(51) Int. Cl.
| | |
|---|---|
| G06K 9/00 | (2006.01) |
| H04N 13/02 | (2006.01) |
| G06K 9/62 | (2006.01) |
| G06T 7/00 | (2017.01) |
| G06T 5/00 | (2006.01) |
| G06T 5/10 | (2006.01) |
| H04N 9/09 | (2006.01) |

(52) U.S. Cl.
CPC ....... *H04N 13/0239* (2013.01); *G06K 9/6204* (2013.01); *G06T 5/002* (2013.01); *G06T 5/10* (2013.01); *G06T 7/0024* (2013.01); *H04N 9/09* (2013.01); *G06T 2207/10012* (2013.01); *G06T 2207/10024* (2013.01); *G06T 2207/20208* (2013.01)

(58) Field of Classification Search
CPC . G02B 27/0075; G06T 15/20; G06T 2200/21; G06T 2207/10012; G06T 2207/10024; G06T 7/593; H04N 13/0022; H04N 2013/0081; H04N 2013/0088
USPC ........................................ 382/154
See application file for complete search history.

(56) References Cited

U.S. PATENT DOCUMENTS

| | | | |
|---|---|---|---|
| 7,587,099 B2 | 9/2009 | Szeliski et al. | |
| 8,588,551 B2 * | 11/2013 | Joshi ...................... | G06T 5/003 382/260 |
| 8,619,082 B1 * | 12/2013 | Ciurea ................... | G06T 7/593 345/427 |
| 8,964,060 B2 | 2/2015 | Levoy et al. | |

* cited by examiner

*Primary Examiner* — Manuchehr Rahmjoo

(74) *Attorney, Agent, or Firm* — McDonnell Boehnen Hulbert & Berghoff LLP

(57) ABSTRACT

The present disclosure relates to methods and systems that may improve and/or modify images captured using multiscopic image capture systems. In an example embodiment, burst image data is captured via a multiscopic image capture system. The burst image data may include at least one image pair. The at least one image pair is aligned based on at least one rectifying homography function. The at least one aligned image pair is warped based on a stereo disparity between the respective images of the image pair. The warped and aligned images are then stacked and a denoising algorithm is applied. Optionally, a high dynamic range algorithm may be applied to at least one output image of the aligned, warped, and denoised images.

20 Claims, 7 Drawing Sheets

SYSTEMS AND METHODS FOR MULTISCOPIC NOISE REDUCTION AND HIGH-DYNAMIC RANGE

BACKGROUND

Multiscopic imaging systems are operable to capture multiple images of a scene. In some cases, the captured images may include common elements from the scene as imaged from different viewing points, from different viewing angles, and/or over different periods of time. Furthermore, image correction may be applied to at least one of the multiple images based on the common elements from the captured images.

SUMMARY

Embodiments in the present disclosure relate to methods and systems for improving image quality in stereoscopic, and more generally, multiscopic imaging systems. Image pairs from a stereoscopic imaging system may be spatially aligned and warped to correct for image parallax. The aligned and warped image pairs may be "stacked". Noise reduction algorithms may be applied to the stacked images. High dynamic range algorithms may be applied to one or more denoised images.

A combination of fast, high resolution estimation of stereo disparity, with a robust burst denoising and HDR processing applied to a simultaneously captured image pair, or image bursts, may provide high resolution, low noise images in less time than is possible using a burst from a single camera.

In an aspect, a system is provided. The system includes a plurality of image capture systems. The plurality of image capture systems includes at least a first image capture system and a second image capture system. The first image capture system is operable to capture first image data and the second image capture system is operable to capture second image data. Respective optical axes of the first and second image capture systems are separated by a baseline distance. The first image data and the second image data include burst image data having at least one image pair. The system also includes a controller. The controller includes a memory and a processor. The memory is configured to contain instructions and the processor is configured to execute the instructions to perform operations. The operations include receiving the burst image data from the plurality of image capture systems. The operations also include determining a stereo disparity of the burst image data based at least on the baseline distance. The operations yet further include adjusting at least one of the first image data or the second image data according to the determined stereo disparity to provide a warped image stack. The operations also include generating at least one output image according to a burst denoising algorithm. The burst denoising algorithm includes determining a weighted average of the warped image stack.

In an aspect, a method is provided. The method includes receiving, by a computing system, burst image data. The burst image data includes first image data generated by a first image-capture system and second image data generated by a second image-capture system. Respective optical axes of the first and second image capture systems are separated by a baseline distance and oriented in substantially the same direction. The first image data and the second image data include at least one image pair. The method includes determining, by the computing system, at least one rectifying homography function. The at least one rectifying homography function is configured to align respective image pairs of the plurality of the image pairs. The method also includes adjusting at least one of the first image data or the second image data according to the at least one rectifying homography function. The method yet further includes determining, by the computing system, a stereo disparity of the burst image data based at least on the baseline distance. The method additionally includes adjusting at least one of the first image data or the second image data according to the determined stereo disparity to provide a warped image stack. The method includes generating at least one output image according to a burst denoising algorithm. The burst denoising algorithm includes determining a weighted average of the warped image stack.

Other aspects, embodiments, and implementations will become apparent to those of ordinary skill in the art by reading the following detailed description, with reference where appropriate to the accompanying drawings.

DETAILED DESCRIPTION

I. Overview

Figure 1A:
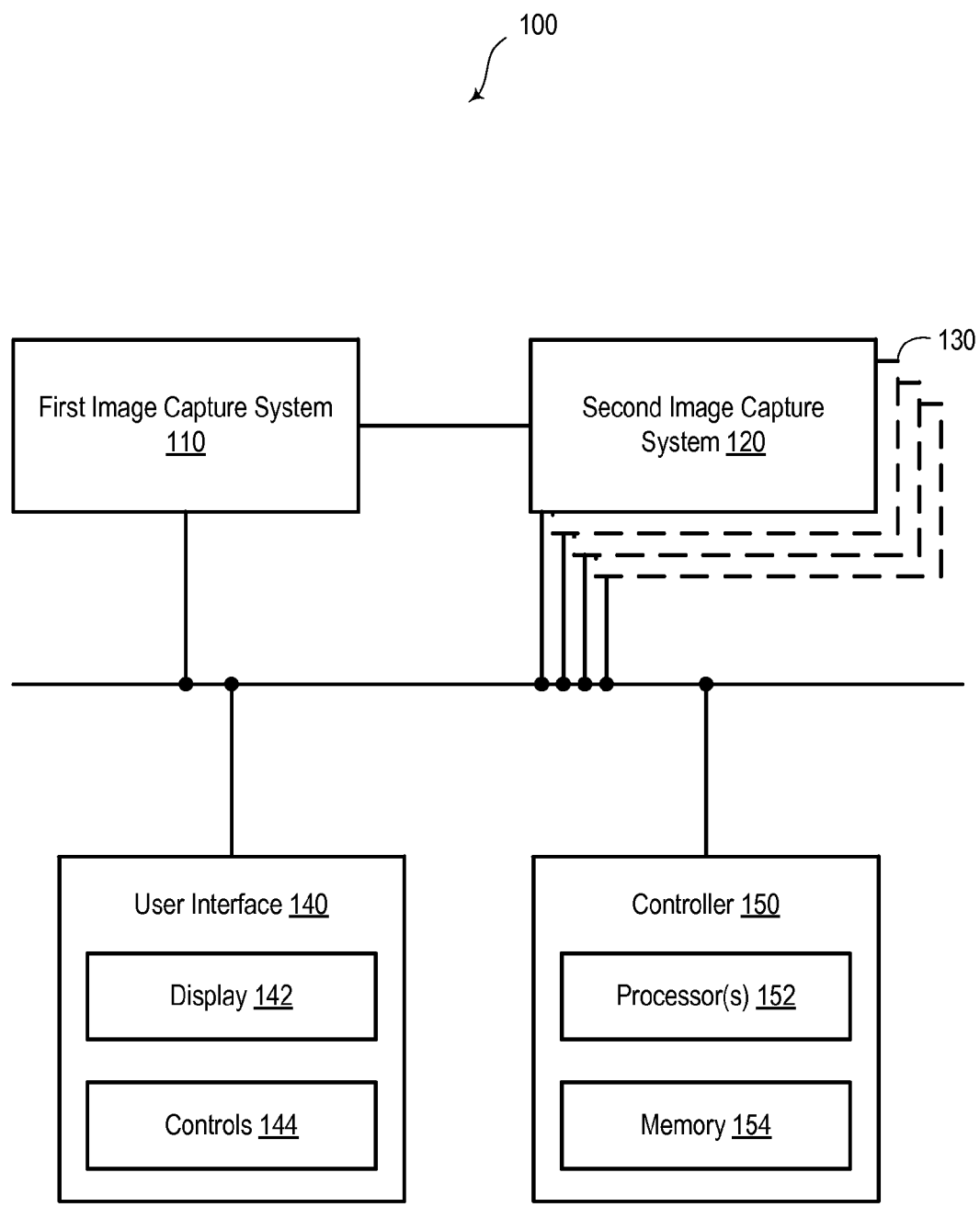
FIG. 1A illustrates a system, according to an example embodiment.

The present disclosure relates to methods and systems that provide noise reduction and high-dynamic range in stereo- and multi-scopic camera systems.

Digital photography quality, particularly for consumer devices such as cellphone cameras, may be limited by small sensor and aperture size. Such characteristics may limit the number of photons that can be captured, which may proportionately increase "shot noise" or the random variance in the number of photons absorbed by a sensor pixel. Increasing the shutter length reduces this noise, but at the possible cost of increased motion blur.

Another limitation is low dynamic range of cellphone camera images. When very bright and very dark objects are present in the same scene, the dynamic range of the sensor pixels may be unable to adequately capture detail in both bright and dark image regions, resulting in either over- or undersaturated pixels. Higher quality cameras use sensors that can read out greater bit depth images, but they are still limited.

A possible solution to both these problems is burst photography, in which instead of taking a single photograph, a camera rapidly takes N photographs. These N images are then merged using one of a variety of algorithms, which results in lower noise and greater dynamic range per-pixel. The problem is that a burst of N photos takes N times as long as a single photo, which may negatively impact the user experience, and also increases the amount of scene motion during the capture.

As described herein, burst photography may be performed by a stereoscopic or multiscopic camera system. The burst image data may be rectified, warped, and denoised to provide a higher quality output image. In such a scenario, high resolution, low noise images may be generated in half the time (or less) of a single image sensor burst.

In an example embodiment, a stereoscopic camera system may capture burst image data. The image "burst" may include 1-10 images captured by each image sensor of the camera in rapid succession. That is, the burst image data may include first image data (e.g., from a first image sensor) and second image data (e.g., from a second image sensor) that include a plurality of image pairs. The image pairs may include corresponding images from the first and second image data captured substantially simultaneously in sequence by the first and second image sensors. The burst image data may include images formatted according to a RAW image format, a WebP image format, a JPEG image format, or another type of image format. Furthermore, in some embodiments, the burst image data may include between 2 and 100 images.

For each image pair, at least one rectifying homography function may be determined by a controller of the system. The rectifying homography function(s) may be determined so as to adjust one or both images of the image pair such that the two images of the image pair are spatially aligned. The rectifying homography function(s) may be determined based on a camera "factory" calibration. Additionally or alternatively, the rectifying homography function(s) may be determined based on another type of calibration. In an example embodiment, the rectifying homography function(s) may include a geometric pixel correction function and a photometric pixel correction function.

In some embodiments, the determination of the at least one rectifying homography function and adjusting the image(s) based on the homography function need not occur. For example, the two images of the image pair may be aligned or registered via other techniques. The other image alignment/registration techniques may include, but are not limited to, translational alignment (e.g., X and Y translation only) or similarity alignment. Furthermore, the alignment techniques disclosed herein may include linear transformations (e.g., rotation, scaling, translation, etc.) and/or non-rigid transformations (e.g., local warping of an image to align with a reference image). Such non-rigid transformations may include "optical flow" transforms.

The controller may be configured to determine a stereo disparity of the burst image data based on at least the baseline distance. The stereo disparity may be determined as part of a three-dimensional image processing method. In an example embodiment, the determination of the stereo disparity may include estimating a parallax function based on the first image data, the second image data, and the baseline distance.

The controller may warp at least one image of each image pair according to the determined stereo disparity. That is, the controller may adjust the at least one image of each image pair such that it substantially matches the corresponding image of the image pair. In an example embodiment, the controller may select a base image from the image pair or from the burst image data more generally. In such a scenario, the controller may adjust all of, or at least a portion of, the other images in the burst image data to substantially match the base image. That is, each other image of the burst image data may be adjusted to match the base image. Furthermore, with respect to the base image, each other image of the burst image data may be: 1) captured with a different image capture system at the same point in time; 2) captured with the same image capture system at a different point in time; or 3) captured with a different image capture system at a different point in time.

In some examples, such image adjustments may include applying an inverse of the estimated parallax function to at least one of the first image data or the second image data. As described elsewhere herein, the image adjustments may include warping one or more images of the burst image data based on information about the epipolar geometry of the image capture systems. Such adjustments and/or warping of the burst image data may form a warped image stack.

In an example embodiment, the controller may generate at least one output image based on a weighted, per-pixel average of the warped image stack. In some embodiments, the controller may group pixels from the warped image stack together in respective image tiles. In such scenarios, the controller may generate the at least one output image based on a weighted average of the respective image tiles. In some embodiments, the respective image tiles may or may not overlap with other image tiles. Other denoising techniques based on a plurality of similar images are contemplated herein.

The controller may further apply a high dynamic range (HDR) function to the at least one output image to provide at least one HDR output image.

The systems and methods contemplated herein may include a variety of different multiscopic imaging systems. For example, the imaging system may include a first image capture system having an image sensor optically coupled to a color filter array (e.g., a Bayer filter) and a second image capture system having an image sensor without such a color filter array. Alternatively or additionally, a first image capture system may include an image sensor optically coupled to a low pass filter and a second image capture system may include an image sensor without such a low pass filter.

In some examples, systems contemplated herein may include image capture systems with optics that have different focal lengths. That is, first image data may be captured with a first focal length and second image data may be captured with a second focal length, providing different "zoom" levels of a given scene.

In an example embodiment, the plurality of image capture systems may be arranged in various ways. For example, the image capture systems may be arranged along a line, such as with most stereoscopic imaging systems. Alternatively or additionally, the image capture systems may be arranged along a boundary of a shape. For instance, the shape may include a ring or a sphere. In such scenarios, the image capture systems may be operable to capture a 360 degree field of view. Other types of multiscopic image capture systems are contemplated.

The controller described herein may include at least one programmable in-circuit serial programming (ICSP) microcontroller. Additionally or alternatively, other types of microprocessors, such as a graphical processing unit (GPU), are contemplated herein.

II. Example Systems

FIG. 1A illustrates a system 100, according to an example embodiment. The system 100 includes a first image capture system 110 and a second image capture system 120. As such, in some embodiments, the system 100 may be considered a stereoscopic imaging system. Additionally or alternatively, system 100 may include further image capture systems 130. In such scenarios, system 100 may be considered a multiscopic imaging system.

The image capture systems 110 and 120 may each include an image sensor, such as a charge-coupled device (CCD) or metal-oxide semiconductor (MOS) sensor. The respective image sensors may include millions of individual photosensors or pixels. In an example embodiment, the respective image sensors may be arranged in a 3:2 aspect ratio and may each include 3,872×2,592 pixels, or approximately ten million pixels. However, many other image sensors with different aspect ratios and more or fewer pixels are contemplated.

The image capture systems 110 and 120 may be operable to provide digital photography and/or digital video information. That is, the image capture systems 110 and 120 may be configured as stereoscopic or multiscopic digital still cameras and/or digital video cameras. Image capture systems 110 and 120 may include various elements including, but not limited to, an aperture, shutter, recording surface (e.g., one or more image sensors), and/or lens.

The plurality of image capture systems may be arranged in different orientations. For example, in the scenario of a stereoscopic imaging system, the image capture systems 110 and 120 may be separated by a baseline distance and with parallel optical axes. Alternatively or additionally, in the case of a multiscopic imaging system, the plurality of image capture systems may be arranged along a boundary of a shape. For example, the shape may include a ring, a disk, or a sphere. Other shapes and/or arrangements of the plurality of image capture systems of system 100 are possible.

The system 100 may include a user interface 140. The user interface 140 may include a display 142 and controls 144. User interface 140 may be configured to generate audible output(s) via a speaker, speaker jack, audio output port, audio output device, earphones, and/or other similar devices.

In an example embodiment, the display 142 may include a viewfinder and/or another display configured to provide information about the system 100. The display 142 may include a multi-element light emitting diode (LED) display, a liquid crystal (LCD) display, a plasma display or another type of display. In an example embodiment, the display 142 may be a touchscreen. In such a scenario, a user of system 100 may be able to adjust settings of the system 100 by interacting with the display 142.

The controls 144 may include buttons, switches, dials, or other types of controls with which a user may interact. Specifically, the controls 144 may include a shutter button and controls operable to adjust focus, field of view, zoom, shutter speed, aperture, and/or ISO, among many other possibilities. In an example embodiment, the shutter button may be operable to trigger an image capture process in which one image frame is captured by each of the image capture systems 110 and 120 to form an image pair. Alternatively or additionally, the shutter button may be operable to trigger a plurality of still images or a video stream. Yet further, some embodiments may include triggering the image capture process via other controls or via the controller 150. For example, the image capture process may be triggered via a timer or remote trigger.

Captured digital images may be represented as a one-dimensional, two-dimensional, or multi-dimensional array of pixels. Each pixel may be represented by one or more values that may encode the respective pixel's color and/or brightness. For example, one possible encoding uses the YCbCr color model. In this color model, the Y channel may represent the brightness of a pixel, and the Cb and Cr channels may represent the blue chrominance and red chrominance, respectively, of the pixel. For instance, each of these channels may take values from 0 to 255. Thus, the brightness of a pixel may be represented by a 0 or a value near zero if the pixel is black or close to black, and by a 255 or a value near 255 if the pixel is white or close to white. However, the value of 255 is a non-limiting reference point, and some implementations may use different maximum values (e.g., 1023, 4095, etc.).

Other color models such as a red-green-blue (RGB) color model or a cyan-magenta-yellow-key (CMYK) may be employed with the embodiments herein. Further, the pixels in an image may be represented in various file formats, including raw (uncompressed) formats, or compressed formats such as Joint Photographic Experts Group (JPEG), Portable Network Graphics (PNG), Graphics Interchange Format (GIF), and so on.

In an example embodiment, the image capture systems 110 and 120 may be configured to capture image frames at a rate of 30 frames per second (FPS). However, image capture systems having greater or lesser frame rates are possible.

Additionally or alternatively, the image capture systems 110 and 120 may include a "burst" capture mode having a burst frame rate. The burst frame rate may include a capture frame rate that is faster than normal over a brief period of time. For example, in a scenario in which the image capture systems 110 and 120 have a "normal" frame rate of 30 FPS, the image capture systems 110 and 120 may each be operable to provide burst image data, which may include two sets of ten image frames (one set from each image capture system) captured consecutively at 60 FPS. Other burst image frame amounts and other burst frame rates are possible.

In an example embodiment, the image capture systems 110 and 120 may be communicatively and/or mechanically coupled so as to provide coordinated image capture. That is, respective image frames may be captured at substantially the same time, (e.g., in synchronicity) by image capture systems 110 and 120. The respective image frames captured at substantially the same time may be termed an image pair.

In some embodiments, as described elsewhere herein, the respective image frames need not be captured at the same time by the first image capture system 110 and the second image capture system 120. However, a relative capture time between the respective image frames may be measured, recorded, and used to more easily correlate and/or determine various image adjustments described herein.

In some embodiments, the image capture systems 110 and 120 may be substantially similar, differing only in physical location and/or orientation. However, in other embodiments, the image capture systems 110 and 120 may differ in other ways. For example, the first image capture system 110 may include an image sensor optically coupled to a color filter array and the second image capture system 120 may include an image sensor without a color filter array (or vice versa). The color filter array may include a Bayer color filter or another type of filter configured to selectively absorb light based on its wavelength.

In an example embodiment, the first image capture system 110 may include an image sensor optically coupled to a low pass filter and the second image capture system 120 may include an image sensor without a low pass filter (or vice versa).

Additionally or alternatively, the first image capture system 110 may include an image sensor optically coupled to optics having a first focal length (e.g. 35 mm) and the second image capture system may include an image sensor optically coupled to optics having a second focal length (e.g. 105 mm), or vice versa. In such a scenario, some or all of the image processing operations described herein may relate to a portion of the image frame. That is, image rectification, warping, denoising, and high-dynamic range processing may be applied to an "overlapping" portion of the image frames where the respective fields of view of the image capture systems overlap.

In an example embodiment, the first image capture system 110 and the second image capture system 120 may be respectively operable as "left" and "right" image sensors (or vice versa) of a stereoscopic or binocular imaging system. That is, a combination of the first image capture system 110 and the second image capture system 120 may be configured to provide stereoscopic imaging information about a scene. In some embodiments, the combination of image capture systems 110 and 120 may provide information indicative of three-dimensional depth and/or information useful to provide visual depth perception.

Alternatively or additionally, the image capture systems 110, 120, and/or 130 may include wearable cameras. Furthermore, any number of the image capture systems 110, 120, and/or 130 may be physically detached from the other image capture systems. That is, the image capture systems contemplated herein may be located in different locations. For example, the image capture systems contemplated herein may include a plurality of smartphone cameras located in different locations and operated by a plurality of users. Additionally or alternatively, one or more of the image capture systems may be in a fixed location (e.g., stabilized on a tripod) and one or other image capture systems may be mobile or moveable. Other combinations, orientations, and arrangements of the plurality of image capture systems are possible.

System 100 also includes a controller 150. The controller 150 may include one or more processors 152 and a memory 154. In an example embodiment, the controller 150 includes at least one programmable in-circuit serial programming (ICSP) microcontroller. Additionally or alternatively, the one or more processors 152 may include one or more general purpose processors (e.g., microprocessors) and/or one or more special purpose processors—e.g., digital signal processors (DSPs), graphics processing units (GPUs), floating point units (FPUs), network processors, or application-specific integrated circuits (ASICs). The memory 154 may be configured to store computer-readable program instructions. The memory 154 may include volatile and/or non-volatile storage components, such as optical, magnetic, organic, or other memory or disc storage, which may be integrated in whole or in part with the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

The one or more processors 152 may be configured to execute the instructions so as to carry out operations. In some embodiments, the operations may include adjustments and/or enhancements to one or more images captured by the image capture systems 110, 120, and/or 130.

The controller 150 may be communicatively coupled to the first image capture system 110, the second image capture system 120, and/or the other image capture systems 130 via a communication interface. The communication interface may include one or more wireless interfaces and/or one or more wired interfaces, which allow the controller 150 to communicate with the other elements of system 100 via one or more networks. In an example embodiment, wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Wired interfaces may include an Ethernet interface, a Universal Serial Bus (USB) interface, or similar interface to communicate via a wire, a twisted pair of wires, a coaxial cable, an optical link, a fiber-optic link, or other type of physical connection. Also, there may be one or more routers, switches, and/or other devices or networks making up at least a part of the communication interface.

While FIG. 1A illustrates the controller 150 as being schematically apart from the first image capture system 110 and the second image capture system 120, the controller 150 may be physically located at, or incorporated into, one or more elements of system 100. For example, the controller 150 may be incorporated into the first image capture system 110. Alternatively, the controller 150 may be incorporated into the second image capture system 120. Yet further, the controller 150 may be distributed among the first image capture system 110 and the second image capture system 120. In another embodiment, the controller 150 may include a distributed computing network and/or a cloud computing network.

Figure 1B:
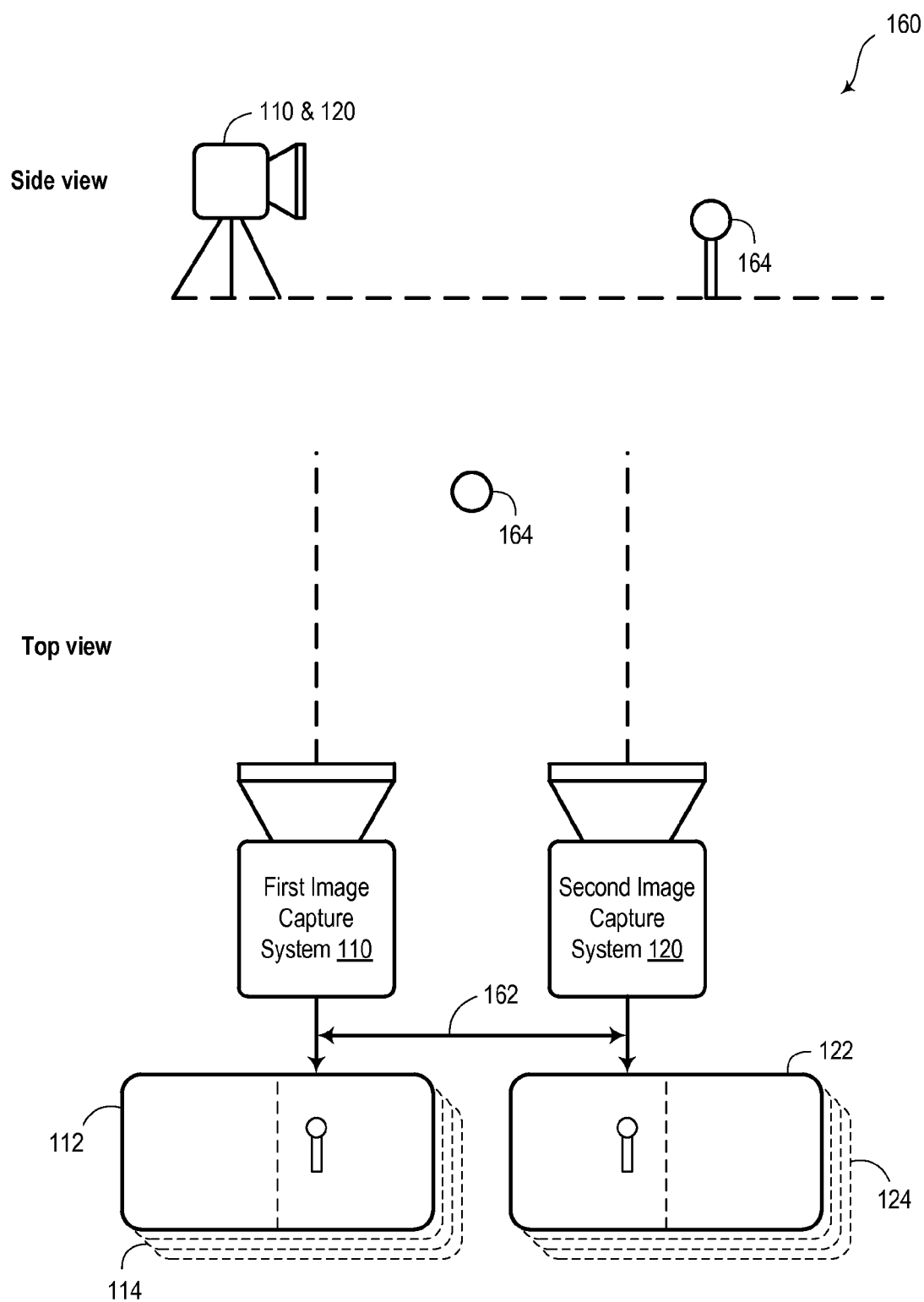
FIG. 1B illustrates a system, according to an example embodiment.

FIG. 1B illustrates side and top views of a system 160, according to an example embodiment. The system 160 may include some or all elements of system 100, as illustrated and described in reference to FIG. 1A. For example, system 160 may include the first image capture system 110 and the second image capture system 120.

A combination of the image capture systems may be arranged to view a scene. Specifically, the system 160 may be configured to provide images (e.g., digital image information) based on the scene.

In an example embodiment, the first image capture system 110 and the second image capture system 120 may be arranged apart from one another at a baseline separation 162, or baseline distance. In some embodiments, the baseline separation 162 may be based on a distance between the respective optical axes of the first image capture system 110 and the second image capture system 120. The optical axes of the first image capture system 110 and the second image capture system 120 may be parallel. However, in some embodiments, the optical axes need not be parallel. Furthermore, at least one of the optical axes may be adjustable.

In some embodiments, the scene may include an object 164. In such a scenario, the first image capture system 110 and the second image capture system 120 may provide respective image data 114 and 124. The image data 114 and 124 may include image information about the scene and object 164. The image data 114 and 124 may differ at least because of the different physical positions of the first image capture system 110 and the second image capture system 120. For example, as illustrated in image frames 112 and 122, the relative position of the object 164 may be different within the image frames 112 and 122. That is, object 164 may be included in both image frames 112 and 122. However, the object 164 may appear in a different relative position in the image frames 112 and 122. The difference in the relative position of object 164 may be considered stereo disparity for that particular image feature. Other image features corresponding to other distances and/or positions from the respective image capture systems may relate to other values of stereo disparity.

Although FIG. 1B includes a scene that only includes object 164, it is understood that a simplistic description is provided for explanatory purposes only. The image capture systems 110 and 120 may be configured to capture more complex scenes. For example, system 160 may be configured to image a variety of different scenes that may include any number of objects or features (or lack of such objects or features).

Figure 2A:
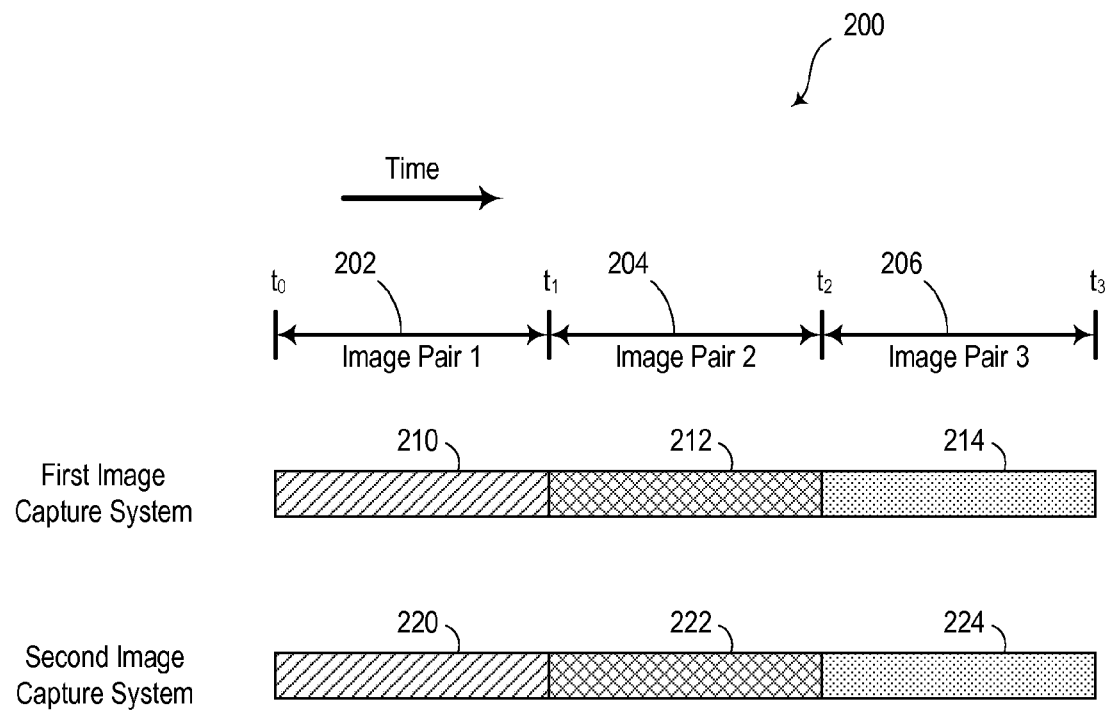
FIG. 2A illustrates an image capture scenario, according to an example embodiment.
Figure 2B:
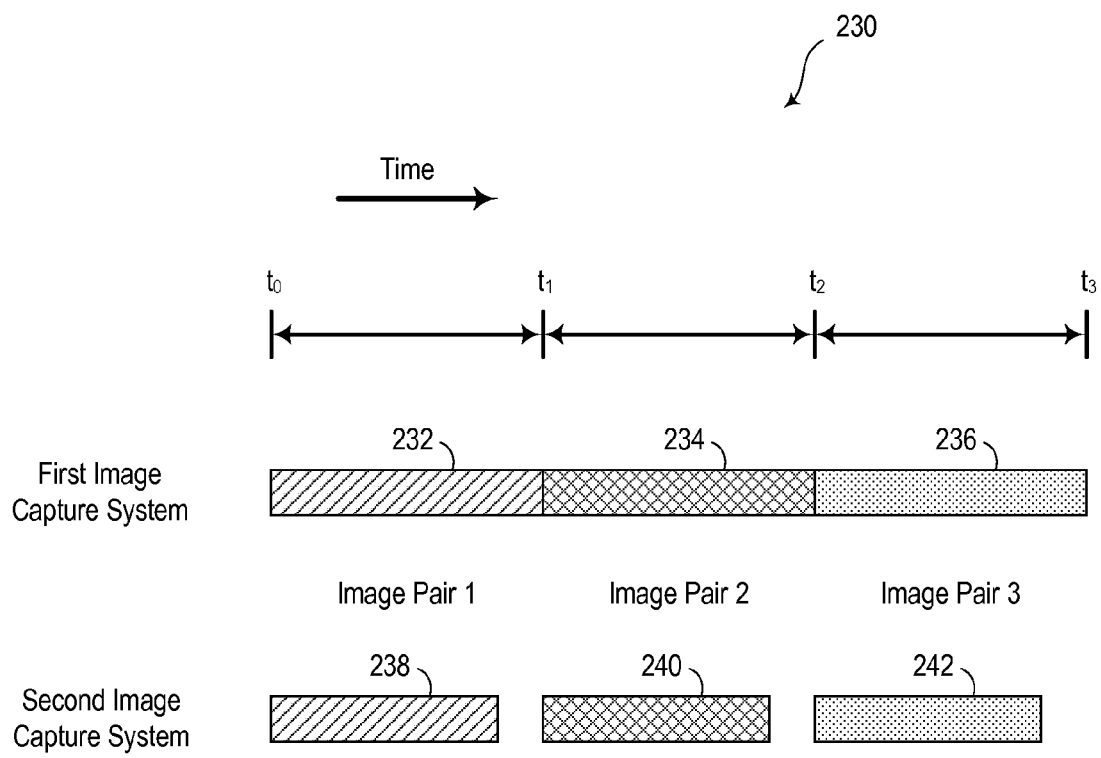
FIG. 2B illustrates an image capture scenario, according to an example embodiment.
Figure 2C:
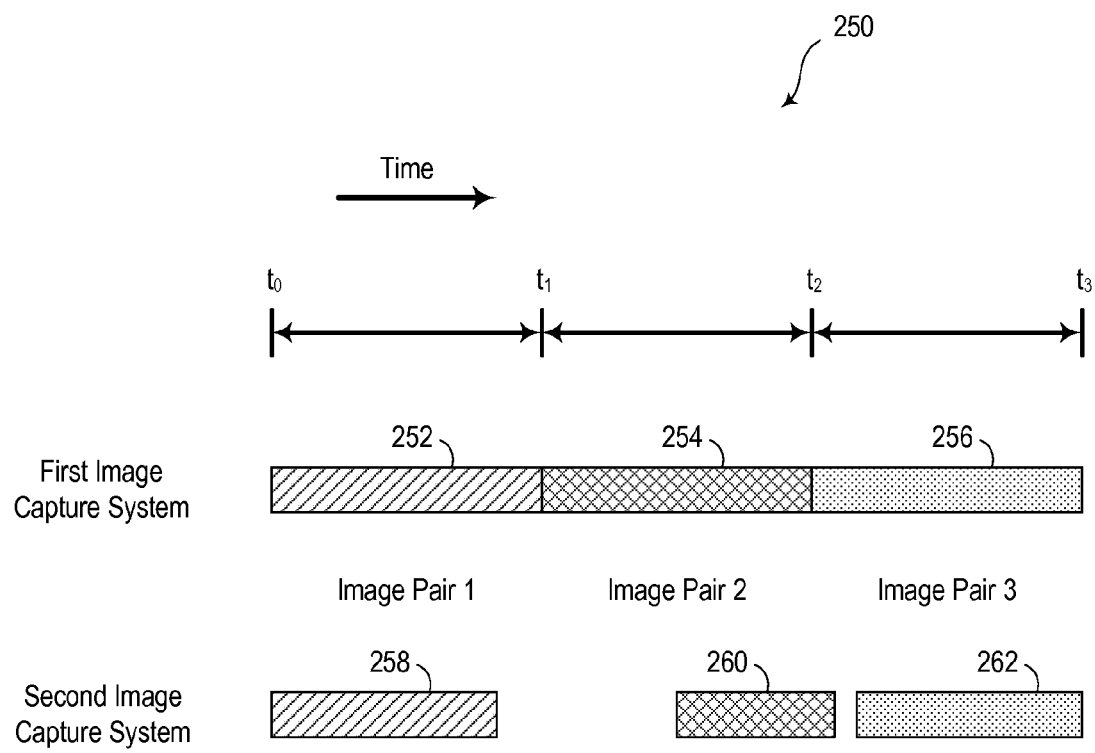
FIG. 2C illustrates an image capture scenario, according to an example embodiment.

FIGS. 2A, 2B, and 2C illustrate various image capture scenarios contemplated within the scope of the present disclosure.

FIG. 2A illustrates an image capture scenario 200, according to an example embodiment. Image capture scenario 200 includes a first image capture system and a second image capture system, which may be similar or identical to the image capture systems 110 and 120 illustrated and described in reference to FIGS. 1A and 1B. At time $t_0$, the first image capture system may begin capturing image frame 210. That is, an image sensor of the first image capture system may collect photons from a scene for an exposure duration 202 between $t_0$ and $t_1$. Also at time $t_0$, the second image capture system may begin capturing image frame 220. Similarly to the first image capture system, the second image capture system may collect photons from the scene for an exposure duration 202 between $t_0$ and $t_1$. The combination of image frame 210 and image frame 220 may be considered image pair 1.

Subsequent image pairs may be captured by the plurality of image capture systems. That is, image pair 2, which includes image frames 212 and 222, may be captured over an exposure duration 204 between $t_1$ and $t_2$. Furthermore, image pair 3 that includes image frames 214 and 224 may be captured over an exposure duration 206 between $t_2$ and $t_3$. It is understood that the specific timing sequences and exposure durations may vary.

FIG. 2B illustrates an image capture scenario 230, according to an example embodiment. In such a scenario, the image frames of the respective image pairs need not be captured with the same exposure duration. For example, image frame 232 may be captured by the first image capture system over an exposure duration from $t_0$ to $t_1$. However, image frame 238 may be captured over a shorter exposure duration. Nonetheless, image frames 232 and 238 may be considered image pair 1 for the purposes of the present disclosure. For example, one or more images from each respective image pair may have a different brightness with respect to a base, or reference, image. In such a scenario, analog and/or digital gain may optionally be applied at the respective image sensor, or digital gain may be applied to the respective image(s) so as to provide a "total exposure" (e.g., a product of exposure time and gain) similar to that of the base image. As such, the various image frames may be more easily compared and/or combined and image rectification, stereo warping, and denoising may still be applied to the constituent image frames. Similarly, image frames 240 and 242 may have different exposure durations compared to corresponding image frames 234 and 236.

FIG. 2C illustrates an image capture scenario 250, according to an example embodiment. As illustrated, image frames 258, 260, and 262 may have different exposure duration and/or may differ in time (e.g., the respective images may be initiated and/or end at different times) compared to corresponding image frames 252, 254, and 256. Nonetheless image frames (252 & 258), (254 & 260), and (256 & 262) may be considered image pairs within the scope of the present disclosure.

Figure 3:
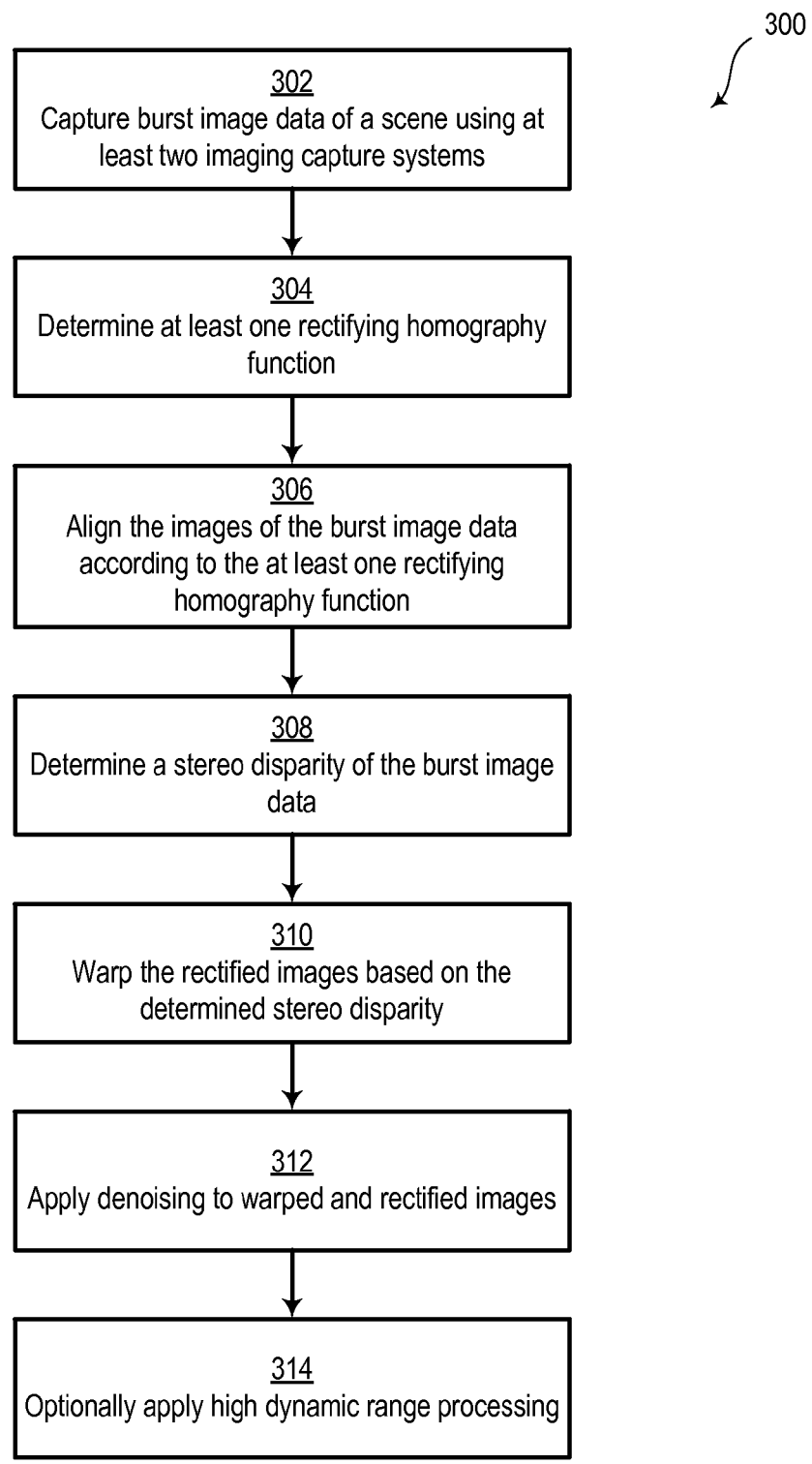
FIG. 3 illustrates a flowchart, according to an example embodiment.

FIG. 3 illustrates a flowchart 300, according to an example embodiment. As described herein, the controller 150 may be configured to carry out various operations. The various blocks of flowchart 300 may illustrate some or all such operations. Furthermore, the blocks of flowchart 300 illustrate and describe operations that may involve elements of systems 100 and/or 160 as illustrated and described in relation to FIGS. 1A and 1B. Although the blocks of flowchart 300 are illustrated as having a particular order, one or more blocks may be removed, added, repeated, completed concurrently with another block, and/or completed out of order.

For example, as shown in block 302, the controller 150 may be operable to receive burst image data from the image capture systems 110 and 120. The burst image data may include first image data from the first image capture system 110 and second image data from the second image capture system 120. The burst image data may include at least one image pair. Additionally or alternatively, the burst image data may include a plurality of image pairs (e.g., 10 image pairs) and/or a video stream.

As illustrated in block 304, the controller 150 may be configured to determine at least one rectifying homography function based on the burst image data. The at least one rectifying homography function may be configured to align corresponding image portions of the at least one image pair. The at least one rectifying homography function may be determined based on a calibration procedure before normal use. For example, the calibration procedure may provide an essential matrix, which may describe the geometrical relationship between the image capture systems 110 and 120.

Additionally or alternatively, the calibration procedure may provide information about an epipolar geometry of the image capture systems 110 and 120. For example, such information may include the corresponding epipolar lines of the image capture systems 110 and 120. Information about the epipolar geometry may improve image processing efficiency at least because knowledge of the epipolar lines may reduce the possible search parameters when trying to align a target image with a reference image (e.g., searching for a corresponding object/feature along a 1D line versus within a 2D area).

Alternatively or additionally, the at least one rectifying homography function may be determined "on the fly" based on, for example, comparisons between the frames of an image pair, such as a corresponding feature in both frames of the image pair. In such a scenario, one or more fundamental matrices between the two cameras may be determined based on the corresponding features of the image pair. As an example, the fundamental matrices may be determined based on minimizing the disparity or least-square difference of corresponding points on the horizontal axis of the image pair.

The rectifying homography function(s) may include a linear transformation. The linear transformation may include a rotational transformation, a scaling transformation, and/or image skew transformation. For example, the rotational transformation may include rotating a first image frame with respect to a second image frame, or vice versa. The scaling transformation may include enlarging or reducing a first image frame with respect to a second image frame, or vice versa. The image skew transformation may include adjusting the image for z-axis tilt. Other types of image transformations are contemplated so as to align or otherwise rectify frames of an image pair and/or burst image data generally.

In an example embodiment, the rectifying homography function(s) may be operable to align image frames based on a calculation or an estimate of the epipolar geometry of a scene. Namely, one or both of the image frames may be transformed to emulate having a common image plane. It is understood that the rectifying homography function(s) may be determined using a variety of image processing techniques. Each such image processing technique is contemplated herein.

As illustrated in block 306, the controller 150 may be operable to adjust at least one of the first image data or the second image data according to the determined at least one rectifying homography function. That is, the controller 150 may align the first image data with the second image data by adjusting the relative rotation, skew, scale, etc. In some embodiments, one of the first image data or the second image data may be modified according to the at least one rectifying homography function. In some other embodiments, both of the first image data and the second image data are modified according to the at least one rectifying homography function.

In an example embodiment, adjusting the first and/or the second image data according to the at least one rectifying homography function may provide a "rough alignment" of the image data prior to further adjusting the image data according to optical flow or other image processing algorithms.

As illustrated in block 308, the controller 150 may be operable to carry out a determination of the stereo disparity of the burst image data. The stereo disparity may include a distance between two corresponding points in a "left" and "right" image of a stereo image pair. In an example embodiment, the stereo disparity may be determined by the controller based at least on the baseline distance. In other embodiments, the stereo disparity may be determined based on a comparison between the left and right images of the stereo image pair. In an example embodiment, the determination of the stereo disparity may include estimating a parallax function based on the first image data, the second image data, and the baseline distance. In other words, the stereo disparity may be determined as part of a three-dimensional image processing method.

In some embodiments, the controller 150 may be configured to provide a disparity image based on the comparison between the left and right images of the stereo image pair. In an example embodiment, the disparity image may include an image frame having pixel brightness levels based on the geometrical disparity between corresponding features in the left and right image frames of the stereo image pair. Additionally or alternatively, the controller 150 may be configured to provide a disparity map based on the comparison between the image frames of the stereo image pair.

Other information may be obtained and/or received to assist in the determination of the stereo disparity. For example, the controller 150 may receive range data via a LIDAR, RADAR, ultrasonic sensor or another type of distance-measuring system. The controller 150 may utilize this range data to determine, at least in part, the stereo disparity.

As illustrated in block 310, the controller 150 may be operable to "warp" or otherwise modify at least one image of each image pair according to the determined stereo disparity. That is, the controller 150 may adjust at least one image of each image pair such that it substantially matches the corresponding image of the image pair. In some examples, such image adjustments may include applying an inverse of the determined stereo disparity and/or the estimated parallax function to at least one of the first image data or the second image data. Such warping of the burst image data may form a warped image stack. In some embodiments, the warped image stack may include image frames that are substantially similar to one another with the possible exception of object motion, camera motion, and/or image noise.

Alternatively or additionally, image adjustments may include moving one or more pixels in a target image based on corresponding locations (e.g., correctly-aligned pixels) in a reference image. In the scenario where two images are captured simultaneously from different perspectives, an optical flow map of the scene may be provided. The optical flow map may include, for example, a relative distance and/or direction for each pixel moved in the target image based on the corresponding correctly-aligned pixels in the reference image. The optical flow map may be used to provide a depth map of the scene. For example, the depth map may be based on the baseline distance and/or the field of view of the image capture system(s).

As illustrated in block 312, the controller 150 may be configured to remove noise from the warped image stack. That is, the controller 150 may apply a burst denoising algorithm to the warped image stack to generate at least one output image. The at least one output image may include less shot noise or other types of image noise.

In an example embodiment, the burst denoising algorithm may include determining a weighted average of the warped image stack. In such a scenario, the weighted average may include a per-pixel average of corresponding pixels of the warped image stack. The weighted average may be based on corresponding pixel intensity, color, and/or luminosity, among other possibilities. Alternatively or additionally, the burst denoising algorithm may include a low pass filter and/or a Fast Fourier Transform (FFT). Yet further, other embodiments may include a burst denoising algorithm that identifies similar pixel regions (e.g. based on color, brightness, etc.) and applies filtering and/or averaging to those regions.

In some embodiments, a Wiener filter may be used to filter undesirable noise from the warped image stack. In such a scenario, the Wiener filter may reduce or minimize the mean square error between an estimated random process (e.g., the shot noise) and the desired image. Additionally or alternatively, other types of image denoising filters are possible, such as Block-Matching and 3D filtering (BM3D) or non-local means. It is understood that a variety of other denoising techniques and algorithms are possible and contemplated herein.

Some pixel encodings use 8 bits to represent the brightness of each pixel. Doing so is referred to as low dynamic range (LDR) imaging. As a result, only 256 levels of brightness may be supported. However, real-world scenes often exhibit a wider dynamic range of brightness than can be reasonably represented by LDR imaging. For example, a scene of an individual standing in a dark room in front of a window may include both extremely bright regions and extremely dark regions. However, use of LDR imaging to capture an image of such a scene may result in loss of detail in the bright region and/or the dark region based on the exposure length with which the image was captured.

A short exposure length may result in a reasonably accurate representation of the bright regions of a scene, but underexposure of the dark regions. Conversely, a long exposure length may result in a reasonably accurate representation of the dark regions, but may overexpose the bright regions. In the example scene, if the exposure length is too long, the features in the room may appear properly-exposed, but the features outside the window may appear white-washed. But if the exposure length is too short, the features outside the window may appear normal but the features in the room may appear darkened. Either of these outcomes is undesirable. For some scenes, there may not be a single exposure length that results in a captured image representing the details in both bright regions and dark regions with acceptable detail.

In the scenario of an individual standing in a dark room in front of a window, a first image frame may be captured with a first exposure length, which may properly expose a sky and a cloud portion of the scene, but may result in an improper exposure (e.g., an underexposure) of a person and the surrounding room. A second image frame may be captured with a second exposure length, which may properly expose the person and the surrounding room, but may result in an improper exposure (e.g., an overexposure) of the sky and the cloud portions of the scene.

Optionally, as illustrated in block 314, the controller 150 may be operable to apply high dynamic range (HDR) processing to the warped image stack and/or one or more output images. Using the foregoing example, properly-exposed pixels of a first image frame of the image stack may be combined with pixels in a second image frame of the image stack that correspond to improperly-exposed pixels in the first image frame. For example, properly-exposed sky and cloud portions from the first image frame may be combined with properly-exposed person and room portions from the second image frame. The resulting composite image may reproduce the details of both the bright and dark regions of the scene reasonably well.

Combining pixels from captured images to form the composite image may be accomplished in a number of ways. For example, a pixel-by-pixel combination of images may be formed by assigning weights to the pixels of each image according to, for instance the brightness of the pixels. Then, depending on its weight, a particular pixel may be included or excluded from the final image. Alternatively, two or more LDR images may be combined into an HDR image, and the HDR image may then be tone mapped so that its brightness falls within a range commensurate with the display abilities of convention video output devices. However, other methods of combining pixels from captured images may be used instead for the embodiments herein.

In some embodiments, HDR processing may be performed based on the image frames captured using automatic exposure bracketing (AEB). That is, the warped image stack may include image frames having a range of exposure durations. As such, an HDR output image may be provided based on the properly exposed regions from a plurality of image frames in the warped image stack. In some embodiments, the burst image data may include image frames captured over 18 exposure values (EV). Other exposure bracketing ranges are possible.

Other ways of applying HDR, or "HDR-like", processing to the warped image stack and/or the output image(s) are possible to provide HDR output images. For example, exposure, brightness, gamma, color, or other aspects of an output image may be adjusted so as to reduce over-exposed and under-exposed regions. In such a scenario, the shadows of the output image may be enhanced and the highlights of the output image may be reduced.

Additionally or alternatively, one or more output images may be tone-mapped to reduce the dynamic range or contrast ratio of the output image while retaining localized contrast. Other ways to reduce over- and under-exposed regions of an image while retaining image detail are contemplated herein.

In an example embodiment, the controller 150 may be operable to analyze the image data so as to group, designate, and/or segregate pixels within each image frame according to "tiles" having image pixels with similar characteristics. As an example, an image frame may be analyzed to determine similar tiles or regions according to one or more image characteristics, such as pixel brightness, color, tone, shape, edge, etc. For example, a pixel area with a high brightness (e.g., a sky) may be associated with a first tile and a pixel area with a lower brightness (e.g., the ground) may be associated with a second tile. In some embodiments, a single image frame may include tens, hundreds, thousands, or more tiles.

The burst image data may be tiled in a manner similar to that described above. As such, the burst image data may include image frames with tiles having a similar shape and position within the respective image frames. Matching corresponding tiles between the respective image frames may be substantially faster than searching over the entire number of pixels.

Accordingly, any of the image processing operations described herein may be carried out based on a per-tile basis. That is, the at least one rectifying homography function may be determined based on aligning the corresponding tiles in the at least one image pair. Furthermore, the stereo disparity may be determined by comparing the relative location of similar tiles in the image frames of the stereo image pair(s). Additionally, the burst denoising algorithm may be carried out by comparing the corresponding tiles of each image frame of the warped image stack. Yet further, the HDR processing may include combining correctly-exposed tiles from various image frames of the warped image stack.

In some embodiments, image processing based on handling tiles may provide improvements in speed and image quality over image processing on a per-pixel basis. For example, tiled image processing may reduce or eliminate "ghosting", blurring image artifacts, and/or artifacts at the edges of tile boundaries.

III. Example Methods

Figure 4:
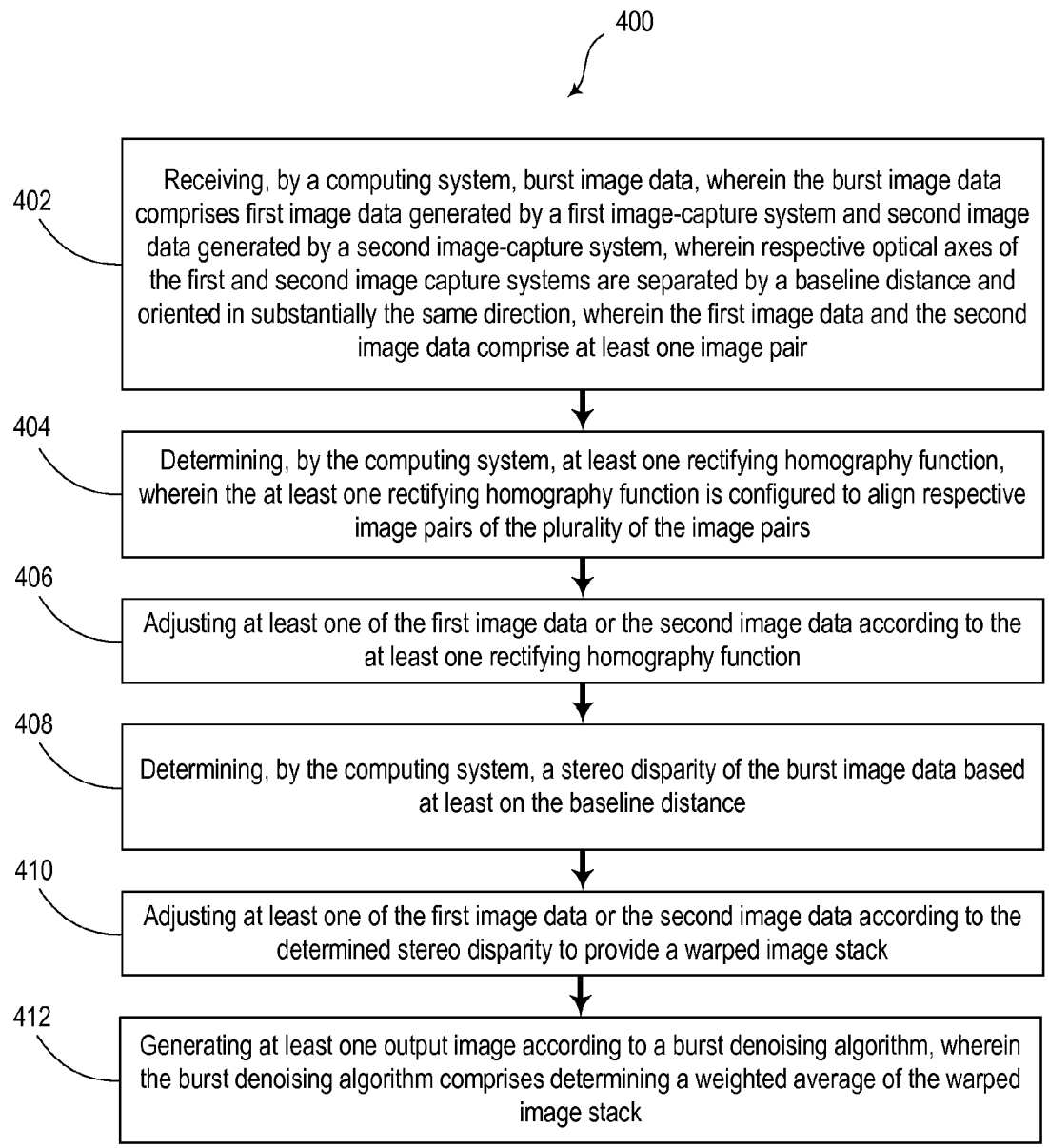
FIG. 4 illustrates a method, according to an example embodiment.

FIG. 4 illustrates a method 400, according to an example embodiment. The method 400 may include various blocks or steps. The blocks or steps may be carried out individually or in combination. The blocks or steps may be carried out in any order and/or in series or in parallel. Further, blocks or steps may be omitted or added to method 400.

Some or all blocks of method 400 may involve elements of system 100 and/or system 160 as illustrated and described in reference to FIGS. 1A and 1B. Furthermore, various blocks of method 400 may be similar or identical to operations illustrated and described in reference to the flowchart 300 of FIG. 3.

Block 402 includes receiving, by a computing system, burst image data. The computing system may be similar or identical to the controller 150 as illustrated and described in relation to FIG. 1A. The burst image data includes first image data generated by a first image-capture system and second image data generated by a second image-capture system. Respective optical axes of the first and second image capture systems may be separated by a baseline distance and oriented in substantially the same direction. The first image data and the second image data include at least one image pair.

Block 404 includes determining, by the computing system, at least one rectifying homography function. The at least one rectifying homography function is configured to align respective image pairs of the plurality of the image pairs. In an example embodiment, the at least one rectifying homography function includes a geometric pixel correction function and a photometric pixel correction function.

Block 406 includes adjusting at least one of the first image data or the second image data according to the at least one rectifying homography function.

Block 408 includes determining, by the computing system, a stereo disparity of the burst image data based at least on the baseline distance. In an example embodiment, determining the stereo disparity of the burst image data includes estimating a parallax function based on the first image data, the second image data, and the baseline distance.

Block 410 includes adjusting at least one of the first image data or the second image data according to the determined stereo disparity to provide a warped image stack. In example embodiment, adjusting at least one of the first image data or the second image data according to the determined stereo disparity includes applying an inverse of the estimated parallax function to at least one of the first image data or the second image data.

Block 412 includes generating at least one output image according to a burst denoising algorithm. The burst denoising algorithm includes determining a weighted average of the warped image stack. For example, in some embodiments, the weighted average includes a per-pixel average of corresponding pixels of the warped image stack.

Optionally, the method may include applying a high dynamic range (HDR) function to the at least one output image to provide at least one HDR output image.

In some embodiments, first image capture system and the second image capture system may provide different respective images based on, for example, the image capture systems having a different image sensor, optical path, optical transfer function (OTF), and/or field of view. In such cases, the methods and processes described herein may still be applied. For example, image alignment, warping, and denoising processes may be applied to burst image data upon compensating for the relevant difference(s) between the images from the respective image capture systems.

As an example, the first image capture system may include an image sensor optically coupled to a color filter array and the second image capture system may include an image sensor without a color filter array. An optional image compensation block or step may include adjusting a brightness level of at least some pixels of image frames from one or both image capture systems based on, for example, a wavelength dependent optical transfer function of the color filter array.

In another scenario, the first image capture system may include an image sensor optically coupled to a low pass filter and the second image capture system may include an image sensor without a low pass filter. In such an example, an optional image compensation block or step may include adjusting a brightness level, or another aspect of the image information, of the image frames based on a wavelength dependent optical transfer function of the low pass filter.

Furthermore, in another embodiment, the first image capture system may include an image sensor optically coupled to optics having, for example, a first focal length and the second image capture system may include an image sensor optically coupled to optics having a second focal length different from the first focal length. In such a scenario, an optional image compensation block or step may include adjusting one or both sets of image data based on the differences in the optics in the respective image capture devices. As a non-limiting example, the image data may be adjusted based on compensating for different field of view, vignetting, distortion (e.g., barrel, pin cushion, or mustache distortion), and chromatic aberration between the two different sets of optics. For instance, a difference in barrel distortion may be compensated using a Brown-Conrady distortion correction algorithm. It is understood that a variety of other image correction algorithms may be implemented so as to compensate for the different optical scenarios described above. All such other image correction algorithms are contemplated within the scope of the present disclosure.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope and spirit being indicated by the following claims.

What is claimed is:

1. A system comprising:
a plurality of image capture systems, wherein the plurality of image capture systems comprises at least a first image capture system and a second image capture system, wherein the first image capture system is operable to capture first image data and the second image capture system is operable to capture second image data, wherein respective optical axes of the first and second image capture systems are separated by a baseline distance, wherein the first image data and the second image data comprise burst image data having at least one image pair; and a controller comprising a memory and a processor, wherein the memory is configured to contain instructions, and wherein processor is configured to execute the instructions to perform operations, the operations comprising:

receiving the burst image data from the plurality of image capture systems;

determining a stereo disparity of the burst image data based at least on the baseline distance;

adjusting at least one of the first image data or the second image data according to the determined stereo disparity to provide a warped image stack; and generating at least one output image according to a burst denoising algorithm, wherein the burst denoising algorithm comprises determining a weighted average of the warped image stack.

2. The system of claim 1, wherein determining the stereo disparity of the burst image data comprises estimating a parallax function based on the first image data, the second image data, and the baseline distance.

3. The system of claim 2, wherein adjusting at least one of the first image data or the second image data according to the determined stereo disparity comprises applying an inverse of the estimated parallax function to at least one of the first image data or the second image data.

4. The system of claim 1, wherein the burst image data comprises images formatted according to at least one of: a raw image format, a WebP image format, or a JPEG image format.

5. The system of claim 1, wherein the burst image data comprises between 2 and 100 images.

6. The system of claim 1, wherein the operations further comprise:

determining at least one rectifying homography function, wherein the at least one rectifying homography function is configured to align corresponding image portions of the at least one image pair;

adjusting at least one of the first image data or the second image data according to the at least one rectifying homography function, wherein the at least one rectifying homography function comprises a geometric pixel correction function and a photometric pixel correction function.

7. The system of claim 1, wherein the weighted average comprises a per-pixel average of corresponding pixels of the warped image stack.

8. The system of claim 1, wherein the operations further comprise applying a high dynamic range (HDR) function to the at least one output image to provide at least one HDR output image.

9. The system of claim 1, wherein the first image capture system comprises an image sensor optically coupled to a color filter array, and wherein the second image capture system comprises an image sensor without a color filter array.

10. The system of claim 1, wherein the first image capture system comprises an image sensor optically coupled to a low pass filter, and wherein the second image capture system comprises an image sensor without a low pass filter.

11. The system of claim 1, wherein the first image capture system comprises an image sensor optically coupled to optics having a first focal length, wherein the second image capture system comprises an image sensor optically coupled to optics having a second focal length, wherein the first focal length and the second focal length are different.

12. The system of claim 1, wherein the controller comprises at least one programmable in-circuit serial programming (ICSP) microcontroller.

13. The system of claim 1, wherein the plurality of image capture systems are arranged along a boundary of a shape, wherein the shape comprises one of: a ring, a disk, or a sphere.

14. A method comprising:

receiving, by a computing system, burst image data, wherein the burst image data comprises first image data generated by a first image-capture system and second image data generated by a second image-capture system, wherein respective optical axes of the first and second image capture systems are separated by a baseline distance and oriented in substantially the same direction, wherein the first image data and the second image data comprise at least one image pair;

determining, by the computing system, at least one rectifying homography function, wherein the at least one rectifying homography function is configured to align respective image pairs of the plurality of the image pairs;

adjusting at least one of the first image data or the second image data according to the at least one rectifying homography function;

determining, by the computing system, a stereo disparity of the burst image data based at least on the baseline distance;

adjusting at least one of the first image data or the second image data according to the determined stereo disparity to provide a warped image stack; and generating at least one output image according to a burst denoising algorithm, wherein the burst denoising algorithm comprises determining a weighted average of the warped image stack.

15. The method of claim 14, wherein determining the stereo disparity of the burst image data comprises estimating a parallax function based on the first image data, the second image data, and the baseline distance.

16. The method of claim 15, wherein adjusting at least one of the first image data or the second image data according to the determined stereo disparity comprises applying an inverse of the estimated parallax function to at least one of the first image data or the second image data.

17. The method of claim 14, wherein the at least one rectifying homography function comprises a geometric pixel correction function and a photometric pixel correction function.

18. The method of claim 14, wherein the weighted average comprises a per-pixel average of corresponding pixels of the warped image stack.

19. The method of claim 14, further comprising applying a high dynamic range (HDR) function to the at least one output image to provide at least one HDR output image.

20. The method of claim 14, wherein the first image capture system comprises an image sensor optically coupled to a color filter array, and wherein the second image capture system comprises an image sensor without a color filter array.

* * * * *